United States Patent
Kagoshima et al.

(10) Patent No.: US 10,152,986 B2
(45) Date of Patent: Dec. 11, 2018

(54) ACOUSTIC PROCESSING APPARATUS, ACOUSTIC PROCESSING METHOD, AND COMPUTER PROGRAM PRODUCT

(71) Applicant: Kabushiki Kaisha Toshiba, Tokyo (JP)

(72) Inventors: Takehiko Kagoshima, Yokohama Kanagawa (JP); Toru Taniguchi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/644,858

(22) Filed: Jul. 10, 2017

(65) Prior Publication Data

US 2018/0233161 A1    Aug. 16, 2018

(30) Foreign Application Priority Data

Feb. 14, 2017    (JP) .................. 2017-024874

(51) Int. Cl.
| | |
|---|---|
| *G10K 15/08* | (2006.01) |
| *H04B 3/20* | (2006.01) |
| *G10L 21/0232* | (2013.01) |
| *H04B 1/16* | (2006.01) |
| *H04R 3/04* | (2006.01) |
| *G10L 21/028* | (2013.01) |

(Continued)

(52) U.S. Cl.
CPC ........ *G10L 21/0232* (2013.01); *G10L 21/028* (2013.01); *G10L 25/78* (2013.01); *H04B 1/1661* (2013.01); *H04R 3/04* (2013.01); *G10L 2021/02082* (2013.01)

(58) Field of Classification Search
CPC ....... G10H 2210/281; G10H 2250/531; G10K 15/12
USPC ...................................... 381/63, 66
See application file for complete search history.

(56) References Cited

U.S. PATENT DOCUMENTS

| | | |
|---|---|---|
| 8,290,170 B2 | 10/2012 | Nakatani et al. |
| 8,467,538 B2 | 6/2013 | Nakatani et al. |

(Continued)

FOREIGN PATENT DOCUMENTS

| | | |
|---|---|---|
| JP | 2009-535674 | 10/2009 |
| JP | 2010-49102 | 3/2010 |

(Continued)

*Primary Examiner* — George C Monikang
(74) *Attorney, Agent, or Firm* — Finnegan, Henderson, Farabow, Garrett & Dunner, L.L.P.

(57) ABSTRACT

An acoustic processing apparatus includes a storage, an estimation unit, and a removal unit. The storage stores therein a reference signal indicating a signal obtained by completing removal of reverberation from a first observation signal included in a first processing section. The estimation unit estimates, on the basis of a model representing an observation signal as a signal obtained by adding a signal obtained by applying a reverberation removal filter to an acoustic signal that is input with a delay and the acoustic signal, a filter coefficient of the reverberation removal filter by using a second observation signal and the reference signal. The removal unit determines an output signal indicating a signal obtained by removing reverberation from the second observation signal by using the second observation signal, the reference signal, and the reverberation removal filter having the estimated filter coefficient.

10 Claims, 8 Drawing Sheets

(51) Int. Cl.
    *G10L 25/78*     (2013.01)
    *G10L 21/0208*     (2013.01)

(56) References Cited

U.S. PATENT DOCUMENTS

| | | |
|---|---|---|
| 8,848,933 B2 | 9/2014 | Yoshioka et al. |
| 2010/0054489 A1 | 3/2010 | Nakajima et al. |
| 2011/0002473 A1* | 1/2011 | Nakatani .................. 381/66 |

FOREIGN PATENT DOCUMENTS

| | | |
|---|---|---|
| JP | 2011-43547 | 3/2011 |
| JP | 5227393 | 3/2013 |
| JP | 5312248 | 7/2013 |
| WO | WO 2009/110574 A1 | 9/2009 |

* cited by examiner

ACOUSTIC PROCESSING APPARATUS, ACOUSTIC PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-024874, filed on Feb. 14, 2017; the entire contents of which are incorporated herein by reference.

FIELD

Embodiments described herein relate generally to an acoustic processing apparatus, an acoustic processing method, and a computer program product.

BACKGROUND

Other than direct sound that arrives directly from a sound source, sound that is reflected by a wall, a floor, a ceiling, and the like to arrive later than the direct sound is referred to as "reverberation". When a sound source is voice, large reverberation makes phonemes unclear to make it difficult to hear the voice. Signal processing technology for removing reverberation from voice collected by a microphone to make it easier to hear the voice has been developed.

One example of the proposed technology is to use an observation signal collected by a microphone to estimate an inverse filter having inverse characteristics to transfer characteristics from a sound source to the microphone, and perform inverse filtering on the observation signal to remove reverberation. Another proposed technology is to estimate a reverberation removal filter from an observation signal on the basis of an autoregressive model representing a current observation signal as a signal obtained by adding a sound source signal to a signal obtained by applying a reverberation removal filter to past observation signals having a predetermined delay, and apply the reverberation removal filter to the observation signal to remove reverberation.

In the conventional technologies, however, the accuracy of reverberation removal may decrease due to mismatching of the model and physical phenomena, use of an approximate filter, and other such reasons.

DETAILED DESCRIPTION

According to one embodiment, an acoustic processing apparatus includes a storage, an estimation unit, and a removal unit. The storage stores therein a reference signal indicating a signal obtained by completing removal of reverberation from a first observation signal included in a first processing section. The estimation unit estimates, on the basis of a model representing an observation signal as a signal obtained by adding a signal obtained by applying a reverberation removal filter to an acoustic signal that is input with a delay and the acoustic signal, a filter coefficient of the reverberation removal filter by using a second observation signal and the reference signal. The removal unit determines an output signal indicating a signal obtained by removing reverberation from the second observation signal by using the second observation signal, the reference signal, and the reverberation removal filter having the estimated filter coefficient.

Referring to the accompanying drawings, an acoustic processing apparatus according to embodiments of the present disclosure is described in detail below. Examples where a voice signal is mainly used as an acoustic signal are described below, but the acoustic signal is not limited to the voice signal.

The above-mentioned autoregressive model is expressed by, for example, the following Expression (1).

$$x(t)=s(t)+\Sigma_{\tau=1}^{K} c(\tau) \times (t-\tau) \quad (1)$$

where s(t) represents a sound source signal at a time t, x(t) represents an observation signal at the time t collected by a microphone, c(τ) represents a coefficient of a reverberation removal filter, and K represents an upper limit of a delay of a reverberation component from direct sound. On the basis of this model, the coefficient of the reverberation removal filter is estimated from the observation signal, and reverberation is removed by filtering expressed by the following Expression (2).

$$y(t)=x(t)-\Sigma_{\tau=D}^{K} c(\tau) \times (t-\tau) \quad (2)$$

where y(t) represents an object signal from which reverberation has been removed, and D represents a lower limit of delay of reverberation to be removed. In general, in the range where the delay is small, it is difficult to distinguish between a component of the sound source signal itself and a reverberation component. Thus, a predetermined delay D is set in order to avoid generation of distortion due to the removal of the sound source signal component.

Figure 1:
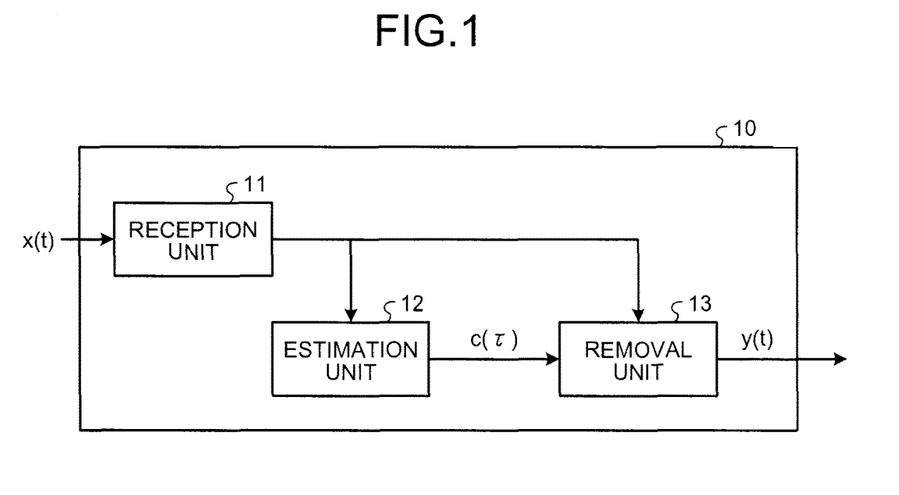
FIG. 1 is a functional block diagram of an acoustic processing apparatus using an autoregressive model.

FIG. 1 is a block diagram illustrating a functional configuration example of an acoustic processing apparatus 10 using the above-mentioned autoregressive model. As illustrated in FIG. 1, the acoustic processing apparatus 10 includes a reception unit 11, an estimation unit 12, and a removal unit 13.

The reception unit 11 receives an input of an observation signal x(t). For example, the reception unit 11 inputs an observation signal collected by a sound collecting device such as a microphone. The estimation unit 12 refers to the observation signal x(t) to estimate a reverberation removal filter coefficient c(τ).

The removal unit 13 performs filtering on the basis of Expression (2) to output an object signal y(t). The reverberation removal filter expressed by Expression (2) is a non-recursive filter (finite impulse response (FIR) filter), which is always stable and output of which never disperses.

Figure 2:
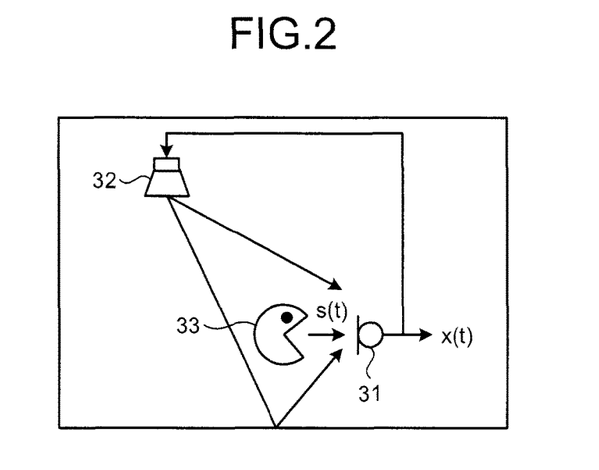
FIG. 2 is a diagram for describing the physical meaning of reverberation represented by the autoregressive model.

FIG. 2 is a diagram for describing the physical meaning of reverberation represented by the autoregressive model used in the acoustic processing apparatus 10. As illustrated in FIG. 2, a sound source signal from an utterer 33, which is a sound source, is collected (observed) by a microphone 31. An observation signal is output from an acoustic output device such as a speaker 32. FIG. 2 shows that only direct sound is observed by the microphone 31 as the sound source signal, and the observation signal is reproduced by the speaker 32 and is collected again by the microphone 31 together with reverberation.

In this manner, the autoregressive model represents reverberation in a situation where, for example, voice collected by the microphone 31 near the mouth of the utterer 33 is amplified and broadcast to a site, and voice reflected in the site is collected by the microphone 31 again.

Figure 3:
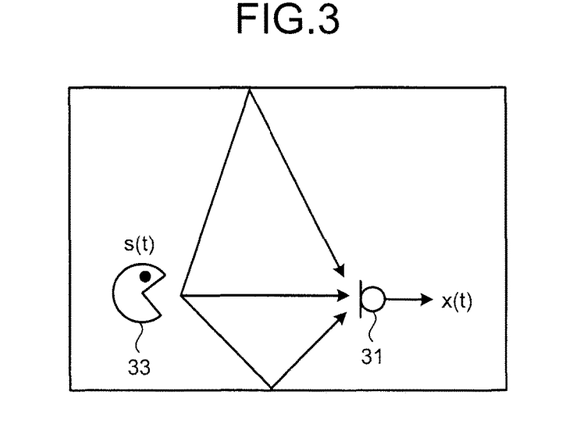
FIG. 3 is a diagram for describing the physical meaning of reverberation represented by a model of Expression (3)

Another situation where reverberation is a problem is that voice is collected from a sound source at a distance from the microphone 31. A model in this case is expressed by the following Expression (3). FIG. 3 is a diagram for describing the physical meaning of reverberation represented by this model.

$$x(t)=s(t)+\Sigma_{\tau=1}^{K} c(\tau)s(t-\tau) \quad (3)$$

FIG. 3 shows that a signal obtained by adding direct sound that directly reaches the microphone 31 from the utterer 33, which is a sound source, and a signal that is obtained when the sound source signal is reflected by a wall or the like and attenuated and delayed is observed by the microphone 31.

In general, signal processing for removing reverberation is often used as preprocessing of voice recognition. The reason is that, for example, when voice is recognized by the microphone 31 at a distance from the mouth of the utterer 33, the accuracy of voice recognition is decreased due to reverberation in a room. A model of reverberation in such application is the model as illustrated in FIG. 3 in which voice is collected by the microphone 31 at a position far from the utterer 33.

The method using the autoregressive model as illustrated in FIG. 1 cannot obtain sufficient accuracy of reverberation removal in the situation illustrated in FIG. 3 because these models assume different situations, that is, these models mismatch.

The method using an inverse filter as described above is based on the model in FIG. 3. If it is supposed that $c(\tau)$ in Expression (3) is successfully determined from the observation signal x(t), an object signal y(t) from which reverberation has been removed is determined by the following Expression (4).

$$y(t)=x(t)-\Sigma_{\tau=D}^{K} c(\tau)y(t-\tau) \quad (4)$$

Figure 4:
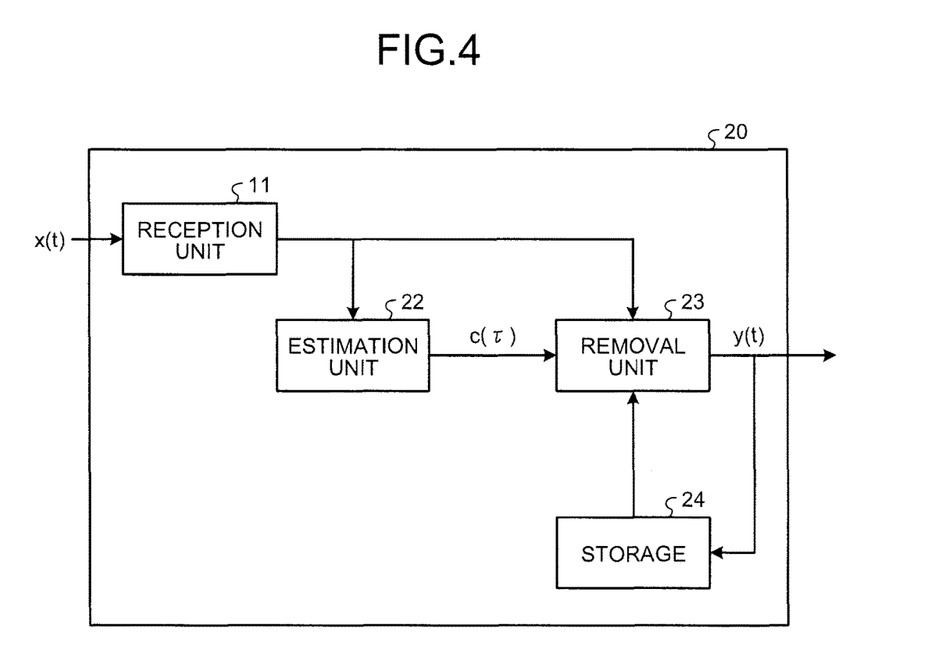
FIG. 4 is a functional block diagram of an acoustic processing apparatus using a model of Expression (4)

FIG. 4 is a block diagram illustrating a functional configuration example of an acoustic processing apparatus 20 using the model of Expression (4). As illustrated in FIG. 4, the acoustic processing apparatus 20 includes a reception unit 11, an estimation unit 22, a removal unit 23, and a storage 24. The reception unit 11 is the same as that in FIG. 1, and is denoted by the same reference numeral and description thereof is omitted.

The estimation unit 22 estimates a reverberation removal filter coefficient $c(\tau)$ on the basis of the model of Expression (3). The removal unit 23 calculates an object signal y(t) on the basis of Expression (4). In this case, past object signals are needed, and hence the removal unit 23 stores calculated object signals y(t) in the storage 24 for use.

In such a configuration, the reverberation removal filter is a recursive filter (infinite impulse response (IIR) filter). Thus, the filter coefficient is liable to be unstable and disperse, which cannot be put into practical use.

In general, the order of the filter necessary for reverberation removal is several tens or more, and the stability of the estimated filter coefficient cannot be guaranteed. Thus, a non-recursive reverberation removal filter (inverse filter) characteristics of which are approximate to those of the recursive reverberation removal filter of Expression (4) is estimated, and reverberation is removed by Expression (2).

As described above, in the configuration as illustrated in FIG. 4, the approximate inverse filter is used instead of the reverberation removal filter based on the model itself. Thus, an error can occur due to approximation, and the accuracy of reverberation removal can be decreased.

An acoustic processing apparatus according to each of the following embodiments is configured such that, in a situation where voice is collected by a microphone at a distance from a sound source, a reverberation removal filter is estimated on the basis of a model conforming to a physical phenomenon in the situation by using a method that prevents a filter coefficient from being unstable. Then, the acoustic processing apparatus according to each of the embodiments performs reverberation removal processing by using the estimated filter. Consequently, the accuracy of reverberation removal processing can be improved.

First Embodiment

Figure 5:
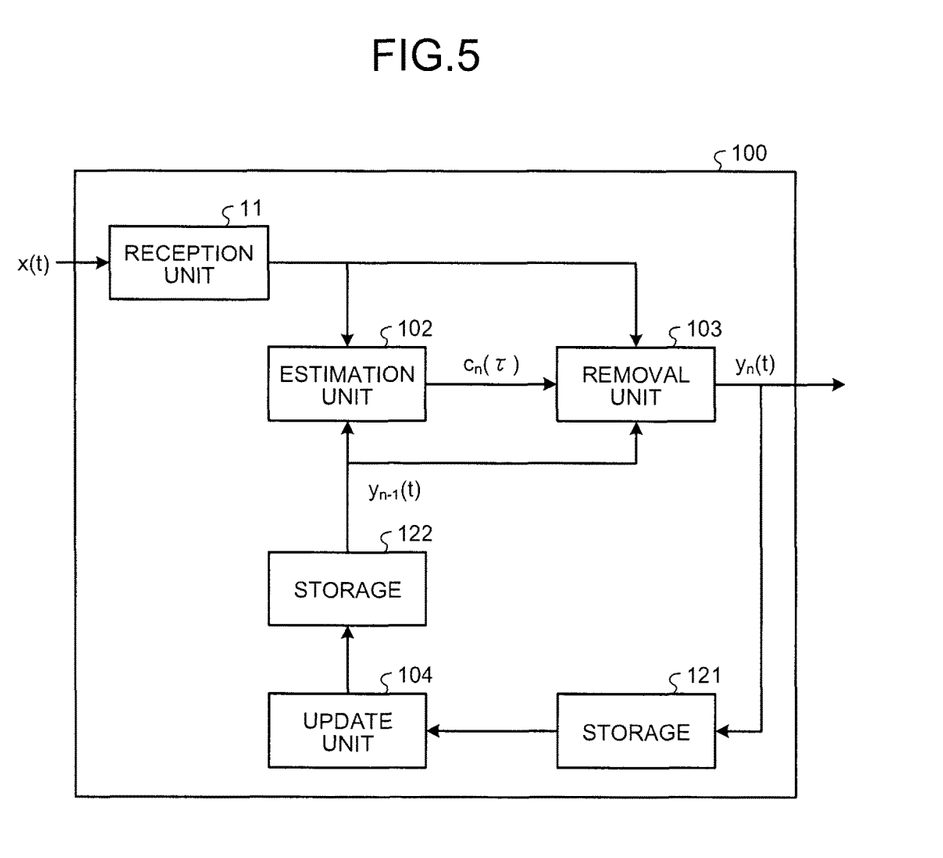
FIG. 5 is a configuration block diagram of an acoustic processing apparatus according to a first embodiment.

FIG. 5 is a block diagram illustrating an example of a configuration of an acoustic processing apparatus 100 according to a first embodiment. As illustrated in FIG. 5, the acoustic processing apparatus 100 includes a reception unit 11, an estimation unit 102, a removal unit 103, an update unit 104, a storage 121, and a storage 122. The reception unit 11 is the same as that in FIG. 1, and is denoted by the same reference numeral and description thereof is omitted.

The acoustic processing apparatus 100 inputs an observation signal x(t) collected by a microphone or other such devices, and outputs an object signal $y_n(t)$ from which reverberation has been removed. In the first embodiment, all observation signals included in a processing section to be processed are repeatedly subjected to reverberation removal processing, and the object signal obtained last is output. The processing section is, for example, a section including time-series acoustic signals to be subjected to voice processing such as voice recognition. The number of repetitions is N (N is an integer of 2 or larger). "n" (n is an integer satisfying 1≤n≤N) in FIG. 5 is an index indicating the count of the repetition.

The storage 121 stores therein the object signal $y_n(t)$ output from the removal unit 103. As described later, the object signal stored in the storage 121 is not directly referenced in reverberation removal processing performed by the removal unit 103.

The storage 122 stores therein an object signal obtained by removing reverberation from the observation signal. The object signal stored in the storage 122 is referenced in filter coefficient estimation processing performed by the estimation unit 102 and reverberation removal processing performed by the removal unit 103. For example, in the case of determining an object signal $y_n(t)$ in the n-th repetition, an object signal $y_{n-1}(t)$ determined in the (n−1)th repetition (in this case, n satisfying 2≤n≤N) and stored in the storage 122 is referenced. No object signal has been determined at the time (n=1) of the start of processing, and hence the storage 122 stores an observation signal therein as an initial value of the object signal to be referenced ($y_0(t)=x(t)$).

After the removal unit 103 executes reverberation removal processing on every observation signal included in the processing section, the update unit 104 updates the object signal stored in the storage 122 with the object signal stored in the storage 121.

The object signal output from the removal unit 103 and stored in the storage 121 is hereinafter sometimes referred to as "output signal", and the object signal stored in the storage 122 and referenced by the removal unit 103 is hereinafter sometimes referred to as "reference signal". The storage 122 corresponds to a storage configured to store therein a reference signal indicating a signal obtained by completing removal of reverberation from an observation signal (first observation signal) included in a given processing section (first processing section).

The estimation unit 102 estimates a filter coefficient of a reverberation removal filter. The estimation unit 102 estimates the filter coefficient on the basis of a model adapted to the situation where sound is collected by a microphone at a distance from a sound source. This model is, for example, a model representing an observation signal as a signal obtained by adding a signal obtained by applying the reverberation removal filter to an acoustic signal that is input with a delay and the acoustic signal. On the basis of this model, the estimation unit 102 estimates the filter coefficient of the reverberation removal filter by using an observation signal (second observation signal) and the reference signal.

The removal unit 103 executes reverberation removal processing for removing reverberation from the observation signal. For example, the removal unit 103 uses the observation signal (second observation signal), the reference signal stored in the storage 122, and the reverberation removal filter having the filter coefficient estimated by the estimation unit 102 to determine an object signal (output signal) obtained by removing reverberation from the observation signal.

In the first embodiment, filter coefficient estimation processing is repeatedly executed N times and reverberation removal processing is repeatedly executed N times for observation signals included in the same processing section. Specifically, the observation signal (first observation signal) used to determine the reference signal stored in the storage 122 and the observation signal (second observation signal) used to determine the object signal in the next repetition by using the reference signal are included in the same processing section.

The update unit 104 updates the reference signal with the output signal. For example, the update unit 104 updates the reference signal stored in the storage 122 such that an output signal determined for the (n−1)th time is used as a reference signal in the n-th repetition.

Each of the above-mentioned units (reception unit 11, estimation unit 102, removal unit 103, and update unit 104) is implemented by, for example, one or more processors (processing circuitry). For example, each of the above-mentioned units may be implemented by one or more processors such as a central processing unit (CPU) executing a computer program, that is, by software. Each of the above-mentioned units may be implemented by one or more processors such as a dedicated integrated circuit (IC), that is, by hardware. Each of the above-mentioned units may be implemented by a combination of software and hardware. When two or more processors are used, each processor may implement one of the units or implement two or more of the units.

The storage 121 and the storage 122 can be configured by any commonly used storage medium, such as a hard disk drive (HDD), an optical disc, a memory card, and a random access memory (RAM). The storage 121 and the storage 122 may be physically different storage media, or may be implemented as different storage areas in physically the same storage medium. Each of the storage 121 and the storage 122 may be implemented by a plurality of physically different storage media.

Figure 6:
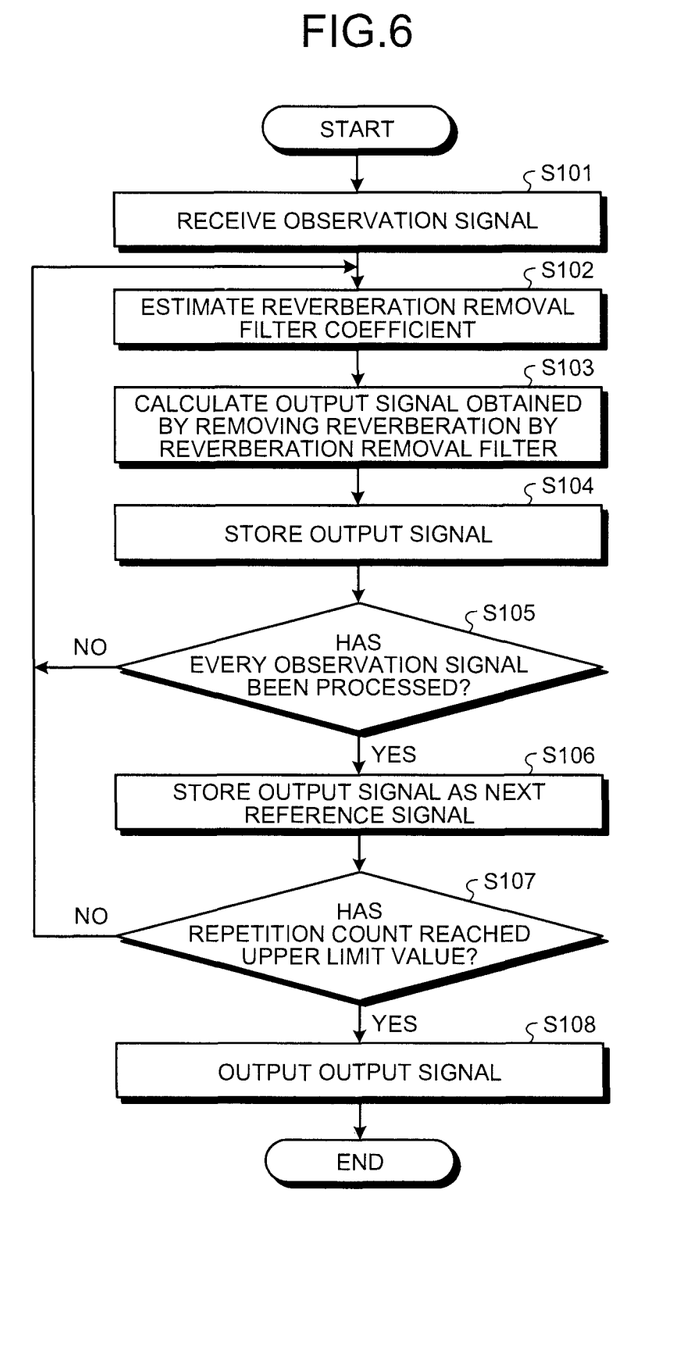
FIG. 6 is a flowchart of reverberation removal processing in the first embodiment.

Next, reverberation removal processing by the acoustic processing apparatus 100 according to the first embodiment configured as described above is described with reference to FIG. 6. FIG. 6 is a flowchart illustrating an example of the reverberation removal processing according to the first embodiment.

The reception unit 11 receives, for example, an observation signal collected by a microphone (Step S101). For the first repetition, an observation signal $x(t)$ is stored in the storage 122 as a reference signal $y_0(t)$.

The estimation unit 102 estimates a filter coefficient of a reverberation removal filter (Step S102). For the first repetition, the estimation unit 102 references the reference signal $y_0(t)$ and the observation signal $x(t)$ in the storage 122 to estimate a filter coefficient $c_1(\tau)$ of the reverberation removal filter.

Next, the removal unit 103 calculates an output signal obtained by removing reverberation from the observation signal with the reverberation removal filter having the estimated filter coefficient $c_1(\tau)$ (Step S103). For example, the removal unit 103 determines an output signal $y_n(t)$ on the basis of the following Expression (5). For the first repetition (n=1), the removal unit 103 calculates an output signal $y_1(t)$.

$$y_n(t)=x(t)-\Sigma_{\tau=D}^{K}c_n(\tau)y_{n-1}(t-\tau) \qquad (5)$$

The removal unit 103 stores the output signal $y_1(t)$ in the storage 121 (Step S104). The estimation unit 102 determines whether all observation signals at the time t included in a processing section have been processed (Step S105). When all observation signals have not been processed (No at Step S105), the flow returns to Step S102, and the processing is repeated on the next observation signal at the time t.

When the output signal $y_1(t)$ has been determined for every observation signal at the time t (Yes at Step S105), the update unit 104 updates contents of the storage 122 such that the output signal $y_1(t)$ stored in the storage 121 is used as a reference signal in the next repetition (Step S106).

Next, the estimation unit 102 determines whether the number of times of processing has reached a repetition count (N) (Step S107). When the number of times of processing has not reached (No at Step S107), the flow returns to Step S102, and the processing is repeated again on all observation signals at the time t included in the processing section.

For example, for the second repetition, n=2 is set, and the processing by the estimation unit 102 and the processing by the removal unit 103 are similarly performed to determine an output signal $y_2(t)$ and store the output signal $y_2(t)$ in the storage 121. The update unit 104 updates the reference signal $y_1(t)$ in the storage 122 with $y_2(t)$ to be used as the next reference signal. After that, the processing is similarly repeated N times.

When the number of times of processing has reached the repetition count (N) (Yes at Step S107), the removal unit 103 outputs an output signal $y_N(t)$ obtained in the N-th processing as a final output signal (Step S108), and finishes the reverberation removal processing.

Figure 7:
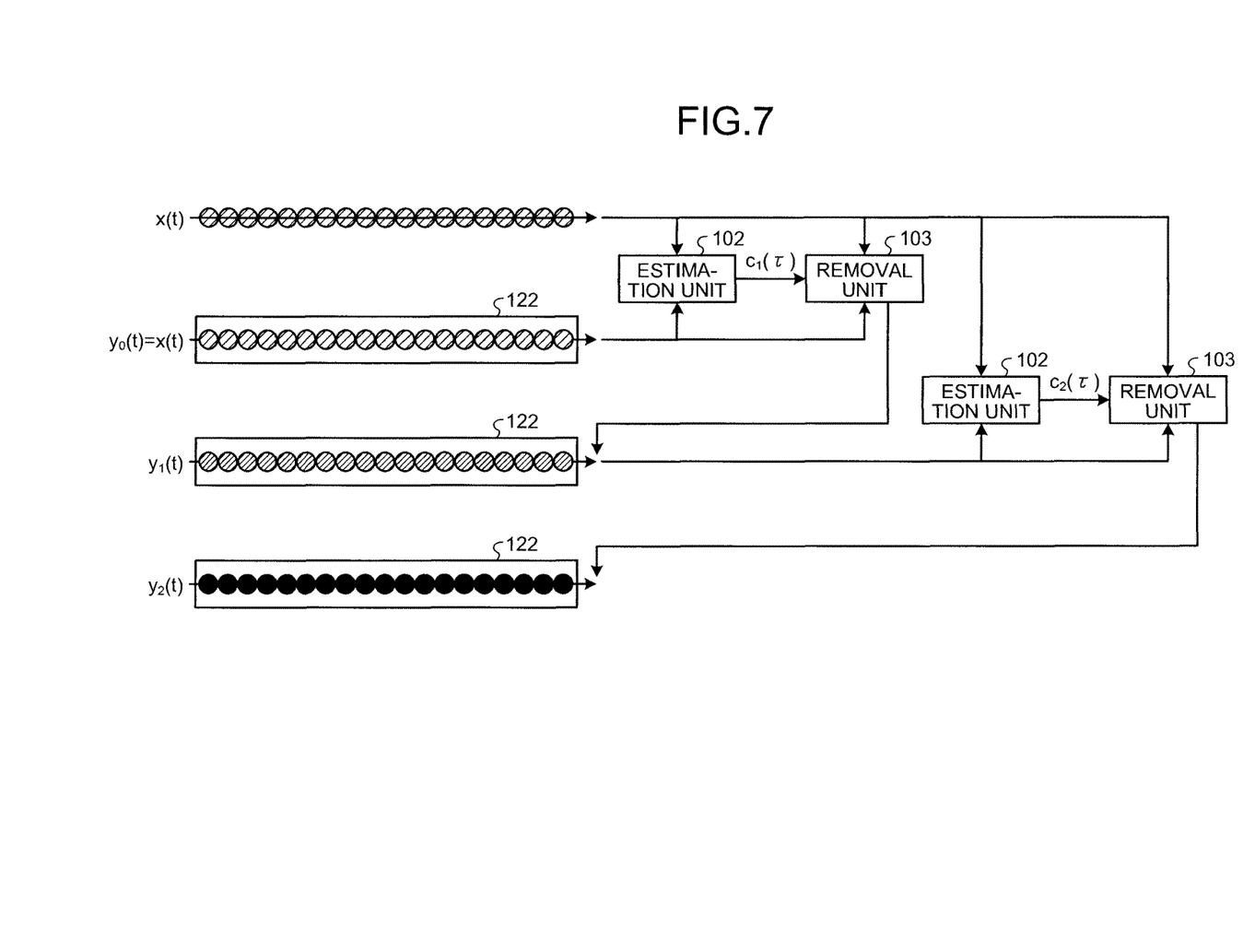
FIG. 7 is a conceptual diagram of the reverberation removal processing in the first embodiment.

FIG. 7 is a conceptual diagram for describing the flow of the reverberation removal processing in the first embodiment. Each white circle represents one sample of each signal (signal at a given time t). x(t) represents observation signals at each time t included in a processing section. y(t) represents reference signals at each time t. In the example in FIG. 7, the section including 19 observation signals is set as the processing section.

For the first repetition, the observation signal x(t) is stored in the storage 122 and is referenced as a reference signal $y_0(t)$. An output signal $y_1(t)$ calculated in the first repetition is stored in the storage 122 as the second reference signal. An output signal $y_2(t)$ calculated in the second repetition is stored in the storage 122 as the third reference signal. The processing is similarly repeated until the number of times of processing reaches the repetition count N.

Next, an example of processing for estimating the reverberation removal filter coefficient by the estimation unit 102 is described. The estimation processing is not limited to the following example, and any method such as a method using a neural network can be applied.

A vector $C_n$ representing the reverberation removal filter coefficient is defined by the following Expression (6).

$$C_n = [c_n(D), c_n(D+1), \ldots, c_n(K)] \tag{6}$$

A vector $Y_{n,\,t-D}$ representing a past reference signal with respect to the current time t is defined by the following Expression (7).

$$Y_{n,t-D} = [y_n(t-D), y_n(t-D-1), \ldots, y_n(t-K)] \tag{7}$$

Using these expressions, Expression (5) is expressed by the following Expression (8). Symbol T represents transposition of a matrix.

$$y_n(t) = x(t) - Y_{n-1,t-D} C_n^T \tag{8}$$

If it is supposed that the output signal $y_n(t)$ from which reverberation has been removed follows a time-varying normal distribution with an average of 0 and a variance of $\sigma(t)^2$, the problem of determining the vector $C_n$ representing the filter coefficient is resolved to the problem of estimating $C_n$ that maximizes an objective function $E(C_n)$ expressed by the following Expression (9).

$$E(C_n) = \Sigma_t \log N(y_n(t); 0, \sigma(t)^2) \tag{9}$$
$$= \Sigma_t \log N(x(t); Y_{n-1,t-D} C_n^T, \sigma(t)^2)$$

where $N(x;\mu,\sigma^2)$ is a function of x representing a normal distribution with an average of $\mu$ and a variance of $\sigma^2$. $C_n$ that maximizes the objective function $E(C_n)$ is determined by the following Expression (10).

$$C_n = \left\{ \Sigma_t \frac{Y_{n-1,t-D}^T Y_{n-1,t-D}}{\sigma(t)^2} \right\}^{-1} \Sigma_t \frac{Y_{n-1,t-D}^T x(t)}{\sigma(t)^2} \tag{10}$$

$\sigma(t)=y_{n-1}(t)$ can be used as an estimated value of the variance, and $C_n$ in this case is determined by the following Expression (11).

$$C_n = \left\{ \Sigma_t \frac{Y_{n-1,t-D}^T Y_{n-1,t-D}}{Y_{n-1}(t)^2} \right\}^{-1} \Sigma_t \frac{Y_{n-1,t-D}^T x(t)}{y_{n-1}(t)^2} \tag{11}$$

When the observation signal is sufficiently large, even if the variance may be a time-independent constant on the assumption that the output signal follows a time-invariant normal distribution, the reverberation removal filter coefficient can be determined with high accuracy. In this case, $\sigma(t)=1$ can be established, and $C_n$ is determined by the following Expression (12).

$$C_n = \{\Sigma_t Y_{n-1,t-D}^T Y_{n-1,t-D}\}^{-1} \Sigma_t Y_{n-1,t-D}^T x(t) \tag{12}$$

In the first embodiment, the reverberation removal filter coefficient is determined on the basis of the model of Expression (3) simulating the physical model of reverberation observed when voice is collected by a microphone at a distance from a sound source, and the determined coefficient is convolved to the reference signal to determine a reverberation component. Consequently, reverberation can be removed with high accuracy. In the course of filtering processing using a set of estimated reverberation removal filter coefficients, the reference signal is not replaced with the output signal, and the filter does not become recursive. Thus, the problem of output dispersal does not arise.

In the above-mentioned embodiment, the values of D and K can be freely set as long as the values satisfy $1 \leq D \leq K$. These values can be set in accordance with characteristics of reverberation in sound collecting environments. In general, early reflected sound with a delay time of 25 ms or less hardly affects the clarity of voice, and hence a value corresponding to about 25 ms can be set for D in accordance with a sampling frequency. The value of K needs to be set slightly large in environments where a reverberation time is long. The amount of calculation tends to be larger as the difference between the values of K and D becomes larger, and hence the values of K and D are adjusted in consideration of balance between performance and the amount of calculation.

In the above-mentioned embodiment, the removal unit 103 determines the output signal on the basis of Expression (5), but the configuration of the removal unit 103 is not limited thereto. For example, when the sign of $y_n(t)$ and the sign of x(t) in Expression (5) are different, $y_n(t)$ may be clipped to 0. Alternatively, when the absolute value of $y_n(t)$ exceeds the absolute value of x(t) in Expression (5), the absolute value of $y_n(t)$ may be limited to the absolute value of x(t). Even when the coefficient of the reverberation removal filter has an error due to the influence of noise, adverse effect of sound quality deterioration caused by reverberation removal can be prevented.

Modification

In the first embodiment, a reverberation removal filter coefficient is estimated for every observation signal in a given processing section. In the present modification, the estimation of the reverberation removal filter coefficient and the reverberation removal processing are performed for each block obtained by dividing an observation signal into predetermined time intervals. Specifically, the processing is executed in a manner that a block obtained by dividing a processing section including a plurality of observation signals is used as a processing section (first processing section).

When the block length is represented by L and an index indicating the number of a block is represented by b, the range of the b-th block is $bL \leq t \leq bL+L-1$. The estimation unit 102 determines a reverberation removal filter coefficient by using the following Expression (13).

$$C_n = \left\{ \sum_{t=bL}^{bL+L-1} \frac{Y_{n-1,t-D}^T Y_{n-1,t-D}}{Y_{n-1}(t)^2} \right\}^{-1} \sum_{t=bL}^{bL+L-1} \frac{Y_{n-1,t-D}^T x(t)}{Y_{n-1}(t)^2} \tag{13}$$

Expression (13) is obtained by modifying Expression (12) for the block-based processing. The removal unit 103 determines an output signal $y_n(t)$ by using Expression (5) in the range of $bL \leq t \leq bL+L-1$. Similarly to the first embodiment, the estimation of the reverberation removal filter coefficient and the calculation of the output signal are repeated N times for the block. The finally obtained output signal is output as a result of the block. When the processing for the b-th block is completed, observation signals in the (b+1)th block are input and sequentially processed.

The present modification enables reverberation to be removed with high accuracy along with a change in reverberation characteristics when the observation signal is large and the reverberation characteristics temporally fluctuate. Furthermore, in the case where object signals from which reverberation has been removed need to be sequentially output in real-time processing, the present modification can be used to reduce a delay of the output.

As described above, in the acoustic processing apparatus according to the first embodiment, the reverberation removal processing is repeatedly executed such that an object signal determined in the previous repetition is referenced in each repetition. Consequently, reverberation can be removed with high accuracy by the filter that is not recursive.

Second Embodiment

Similarly to the above-mentioned modification, an acoustic processing apparatus according to a second embodiment is configured to execute reverberation removal processing in a manner that a block obtained by dividing a processing section including observation signals is used as a processing section. In the second embodiment, an object signal determined the previous block (first processing section) is used as a reference signal to execute reverberation removal processing for the subsequent block (second processing section).

Figure 8:
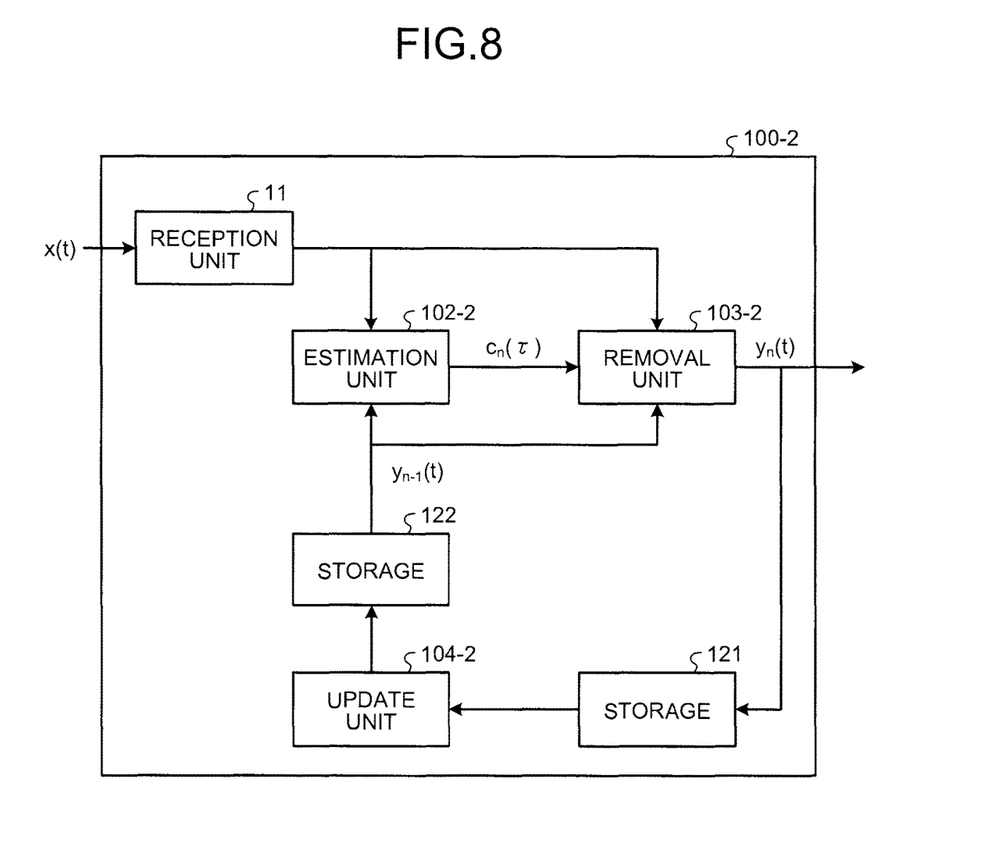
FIG. 8 is a configuration block diagram of an acoustic processing apparatus according to a second embodiment.

FIG. 8 is a block diagram illustrating an example of a configuration of an acoustic processing apparatus 100-2 according to the second embodiment. As illustrated in FIG. 8, the acoustic processing apparatus 100-2 includes a reception unit 11, an estimation unit 102-2, a removal unit 103-2, an update unit 104-2, a storage 121, and a storage 122.

The second embodiment differs from the first embodiment in functions of the estimation unit 102-2, the removal unit 103-2, and the update unit 104-2. Other configurations and functions are the same as those in FIG. 5, which is a block diagram of the acoustic processing apparatus 100 according to the first embodiment, and are therefore denoted by the same reference symbols and descriptions thereof are omitted.

The estimation unit 102-2 differs from the estimation unit 102 in the first embodiment in executing filter coefficient estimation processing by using the object signal calculated in the previous processing section (block) as a reference signal. The removal unit 103-2 differs from the removal unit 103 in the first embodiment in executing reverberation removal processing by using the object signal calculated in the previous processing section (block) as a reference signal. The update unit 104-2 updates the reference signal stored in the storage 122 such that the output signal determined in the previous processing section (block) is used as the reference signal in the next processing section (block).

As described above, in the second embodiment, observation signals included in a given processing section (block) are subjected to reverberation removal processing in a manner that the object signal calculated in the previous processing section (block) is used as a reference signal. Specifically, an observation signal (first observation signal) used to determine the reference signal stored in the storage 122 and an observation signal (second observation signal) used to determine an object signal in the next repetition by using the reference signal are included in different processing sections (blocks).

The second embodiment can be applied when the block length L and the lower limit value D of a delay of reverberation to be removed satisfy the relation of $L \leq D$. When $L \leq D$ is established, a reference signal to be referenced by processing for estimating a filter coefficient in a given block is determined by an output signal in the previous block. Specifically, the reference signal is not replaced with the output signal calculated in the current block, and the filter does not become recursive. Thus, the problem of output dispersal does not arise.

Figure 9:
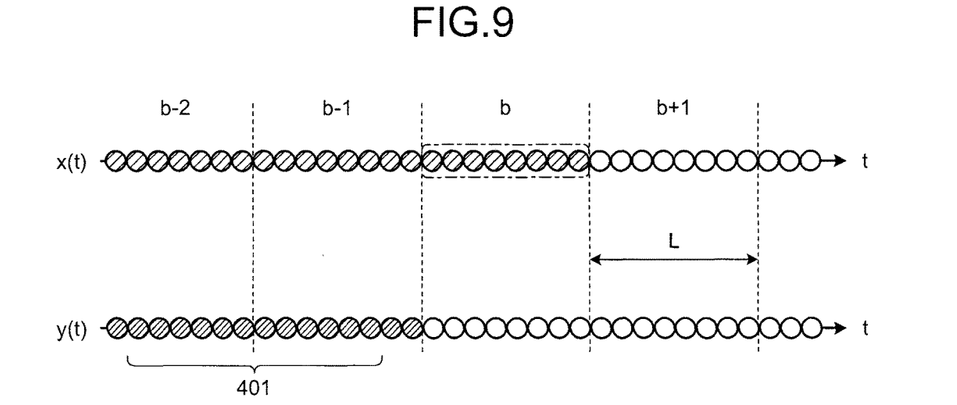
FIG. 9 is a conceptual diagram of reverberation removal processing in the second embodiment.

FIG. 9 is a conceptual diagram for describing the flow of the reverberation removal processing in the second embodiment. Each white circle represents one sample of each signal (signal at a given time t). x(t) represents observation signals at each time t included in a processing section. y(t) represents reference signals at each time t. The broken lines represent the boundaries of blocks. In the example in FIG. 9, the block length L is 8.

Supposing that processing in the (b−1)th block has been completed, the procedure of processing the b-th block is described. At this time point, object signals determined in the (b−1)th and preceding blocks are stored in the storage 122 as reference signals. For the b-th block, an observation signal is stored as an initial value of the reference signal.

Processing by the estimation unit 102-2 is described. First, the estimation unit 102-2 determines a matrix $R_n$ and a vector $r_n$ expressed by the following Expression (14) and Expression (15).

$$R_n = \sum_{t=bL}^{bL+L-1} \frac{Y_{n-1,t-D}^T Y_{n-1,t-D}}{Y_{n-1}(t)^2} \tag{14}$$

$$r_n = \sum_{t=bL}^{bL+L-1} \frac{Y_{n-1,t-D}^T x(t)}{Y_{n-1}(t)^2} \tag{15}$$

Next, the estimation unit 102-2 uses the matrix $R_n$ determined by Expression (14), the vector $r_n$ determined by Expression (15), a matrix $R_n^{b-1}$ and a vector $r_n^{b-1}$ in the previous block, and a predetermined smoothing coefficient $\alpha$ to determine a matrix $R_n^b$ and a vector $r_n^b$ in the block concerned by the following Expression (16) and Expression (17).

$$R_n^b = \alpha R_n^{b-1} + (1-\alpha) R_n \tag{16}$$

$$r_n^b = \alpha r_n^{b-1} + (1-\alpha) r_n \tag{17}$$

The value of $\alpha$ is set in the range of $0 < \alpha < 1$. For example, a value that is closer to 1 (for example, 0.9) is used for $\alpha$ as L becomes smaller. The estimation unit 102-2 uses these parameters to determine a reverberation removal filter coefficient $C_n$ by the following Expression (18).

$$C_n = (R_n^b)^{-1} r_n^b \tag{18}$$

Next, the removal unit 103-2 calculates an output signal of the block concerned by using Expression (5), and stores the output signal in the storage 121. Next, the update unit 104-2 updates a reference signal in the block concerned in the storage 122 with the output signal in the storage 121.

In the processing by the estimation unit 102-2 in the second embodiment, L≤D is established for the range to be referenced by $Y_{n-1, t-D}$ in Expression (14) and Expression (15), and the range is thus always included in the (b−1)th or preceding blocks. For example, when the lower limit value D of the delay of reverberation is 10 and the upper limit value K thereof is 14, the range to be referenced by $Y_{n-1, t-D}$ is a range 401 in FIG. 9.

Specifically, in the second embodiment, in the first reverberation removal filter estimation processing (n=1) in the block concerned, the reference signal is determined as the output signal in the previous block, and hence the reverberation removal filter based on the reverberation model of Expression (3) can be estimated, and the repetition is not necessarily required. When the repetition is not performed, the amount of calculation can be reduced as compared with when the repetition is performed.

Furthermore, in the second embodiment, the reverberation removal filter coefficient is not determined based only on the block concerned but determined by using information on preceding signals and smoothing the matrix $R_n^b$ and the vector $r_n^b$. Consequently, even when the block is short, a filter coefficient capable of removing reverberation with high accuracy can be determined with stability.

Note that the filter coefficient may be determined by a method similar to that in the first embodiment without executing the smoothing. For example, the filter coefficient may be determined by Expression (10), Expression (11), or Expression (12) instead of Expression (18). In the case where there is no output signal (reference signal) in a previous block, such as in the first block, an observation signal in the block concerned may be used as an initial value of the reference signal.

As described above, the second embodiment enables an algorithm delay and the amount of calculation to be reduced while maintaining high reverberation removal performance. Thus, the second embodiment is suitable for real-time processing.

Third Embodiment

An acoustic processing apparatus according to a third embodiment is configured to divide an observation signal into observation signals (frequency-specific observation signals) divided depending on frequencies, and perform reverberation removal processing for each frequency-specific observation signal. Then, the acoustic processing apparatus according to the third embodiment is configured to determine an object signal by integrating object signals (frequency-specific object signals) from which reverberation has been removed, which are determined for respective frequencies.

Figure 10:
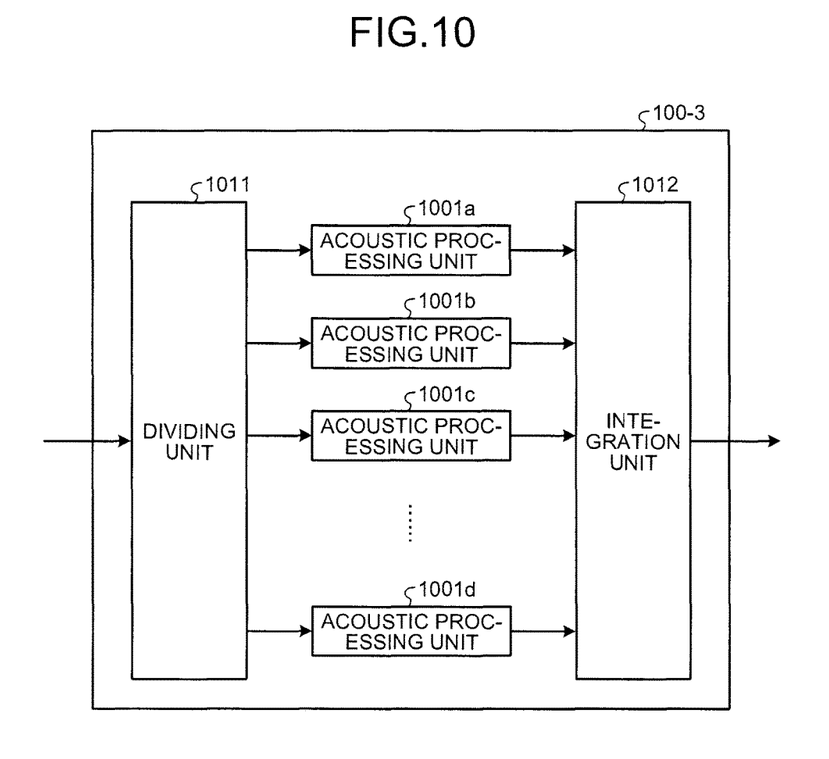
FIG. 10 is a configuration block diagram of an acoustic processing apparatus according to a third embodiment.

FIG. 10 is a block diagram illustrating an example of a configuration of an acoustic processing apparatus 100-3 according to the third embodiment. As illustrated in FIG. 10, the acoustic processing apparatus 100-3 includes a dividing unit 1011, acoustic processing units 1001a to 1001d, and an integration unit 1012.

The acoustic processing units 1001a to 1001d execute acoustic removal processing by inputting frequency-specific observation signals divided by the dividing unit 1011. The acoustic processing units 1001a to 1001d have the same function, and are hereinafter simply referred to as "acoustic processing units 1001" unless otherwise needed to be distinguished. FIG. 10 illustrates an example where the acoustic processing apparatus includes four acoustic processing units 1001, but the acoustic processing apparatus only needs to include acoustic processing units 1001 in number corresponding to the number of frequencies to be divided. An example where an observation signal is divided into F frequency regions and the acoustic processing apparatus includes F acoustic processing units 1001 is described below.

The dividing unit 1011 performs bandwidth dividing processing on an input observation signal to divide the observation signal into F pieces of frequency bandwidths, and outputs F pieces of frequency-specific observation signals. Due to the bandwidth dividing processing, the sampling frequency of the frequency-specific observation signal is reduced as compared with the sampling frequency of the observation signal.

Each of the F pieces of acoustic processing units 1001 inputs a corresponding frequency-specific observation signal among the F pieces of frequency-specific observation signals. The acoustic processing unit 1001 performs reverberation removal processing on the input frequency-specific observation signal (second observation signal), and outputs a frequency-specific object signal.

The integration unit 1012 receives F pieces of frequency-specific object signals from the F pieces of acoustic processing units 1001, performs processing for integrating frequency bandwidths of the F frequency-specific object signals, and outputs an object signal having the same sampling frequency as that of the observation signal.

The dividing unit 1011 can be configured by, for example, fast Fourier transform (FFT). For example, the dividing unit 1011 multiplies an observation signal for each predetermined frame period by a window function to acquire a short-time waveform, and the FFT is applied to perform bandwidth division. For example, when the window function length (FFT length) is 512 samples, the number of frequency bandwidths is 512. Due to the symmetry, the number of bandwidths to be processed is F=257, which is almost the half the number of the frequency bandwidths.

A signal obtained by connecting, between frames, values corresponding to the same frequency bin among values obtained by the application of the FFT is a frequency-specific observation signal. Thus, the sampling period of the frequency-specific observation signal is equal to a frame period. For example, when the frame period is 128 samples, the sampling period of the frequency-specific observation signal is 128 times as large as the sampling period of the observation signal.

The acoustic processing unit 1001 can use any one of the acoustic processing apparatuses in the above-mentioned first and second embodiments. Note that the frequency-specific observation signal in the third embodiment is a complex number as a result of the FFT processing, and hence the signal processing in the above-mentioned embodiments needs to be used so as to be extended to a complex number. Specifically, by extending the signal processing such that the transposition of a matrix is changed to the conjugate transposition, and the square of the value is changed to the square of the absolute value, reverberation removal can also be applied to a complex signal.

The function of the removal unit included in the acoustic processing unit 1001 may be the same as those in the above-mentioned first and second embodiments, and the removal unit may be configured to remove a reverberation component on the basis of the absolute value by ignoring the phase of a complex signal. In this case, the removal unit determines an output signal by the following Expression (19) and Expression (20) instead of Expression (5).

$$y_n(t) = \begin{cases} 0, & (|x(t)| - |v_n(t)| < 0) \\ \dfrac{(|x(t)| - |v_n(t)|)}{|x(t)|} x(t), & (|x(t)| - |v_n(t)| \geq 0) \end{cases} \quad (19)$$

$$v_n(t) = \sum_{t=D}^{K} c_n(\tau) y_{n-1}(t - \tau) \quad (20)$$

According to the third embodiment, power of the output signal is equal to or lower than power of the observation signal, and hence adverse effect caused by reverberation removal can be prevented to perform robust processing.

The integration unit 1012 receives F pieces of frequency-specific object signals, and integrates frequency bandwidths for each frame and applies inverse FFT (IFFT), thereby generating a short-time waveform for each frame. After applying a combined window function for suppressing discontinuity at ends of each short-time waveform, the integration unit 1012 superimposing the short-time waveforms for the respective frames while shifting the short-time waveforms by the frame period, thereby generating an object signal.

In the third embodiment, the sampling frequency of the frequency-specific observation signal is reduced, and hence the values of parameters (D and K in Expression (5)) related to the reverberation time in the acoustic processing unit 1001 are reduced. As a result, the amount of calculation in the acoustic processing unit 1001 is significantly reduced as compared with the first and second embodiments, and the amount of calculation is reduced even when including the amount of calculation in the dividing unit 1011 and the integration unit 1012.

The configuration of the dividing unit 1011 is not limited to the above. For example, the dividing unit 1011 may use a perfect reconstruction filter bank. This configuration is implemented by, for example, combining an analysis filter based on a quadrature mirror filter (QMF) and ½ subsampling in multiple stages.

The integration unit 1012 is implemented by combining double oversampling and an analysis filter based on a QMF in multiple stages. In the configuration using a perfect reconstruction filter bank, the frequency-specific observation signal is a real-valued signal, and hence the amount of calculation is further reduced as compared with the configuration using an FFT.

In the above-mentioned embodiment, reverberation removal processing is performed on all of the divided F pieces of frequency-specific observation signals. However, reverberation removal processing may be performed on only a part of the signals. For example, reverberation removal processing may be performed on only frequency-specific observation signals in bandwidths corresponding to the range of about 100 Hz to 2,000 Hz. Major frequency components of voice are included in these bandwidths, and hence the clarity of voice can be achieved by reverberation removal, and the amount of calculation can be reduced. Different parameters may be set for frequency-specific observation signals. For example, by a small value is set to K in Expression (5) for a frequency with which the reverberation time is relatively short, the amount of calculation can be reduced without decreasing the performance.

Fourth Embodiment

An acoustic processing apparatus according to a fourth embodiment has a function of executing voice recognition processing on the basis of an acoustic signal from which reverberation has been removed.

Figure 11:
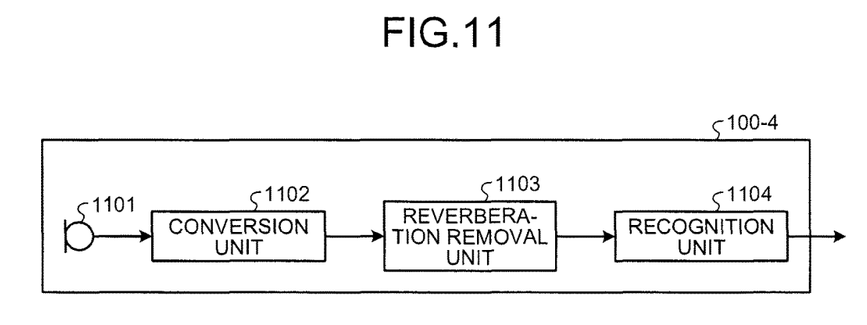
FIG. 11 is a configuration block diagram of an acoustic processing apparatus according to a fourth embodiment.

FIG. 11 is a block diagram illustrating an example of a configuration of an acoustic processing apparatus 100-4 according to the fourth embodiment. As illustrated in FIG. 11, the acoustic processing apparatus 100-4 includes a microphone 1101, a conversion unit 1102, a reverberation removal unit 1103, and a recognition unit 1104.

The microphone 1101 collects voice to output an observation signal. For example, the microphone 1101 outputs an observation signal that is an analog voice signal containing reverberation. Instead of being included in the acoustic processing apparatus 100-4, the microphone 1101 may be connected to the acoustic processing apparatus 100-4 such that an observation signal is input from the microphone 1101.

The conversion unit 1102 converts the observation signal, which is an analog signal, into a digital signal. The conversion unit 1102 together with the microphone 1101 may be provided outside the acoustic processing apparatus 100-4. In this case, the reverberation removal unit 1103 can input a digital signal converted by the conversion unit 1102 as an observation signal.

The reverberation removal unit 1103 can use any one of the acoustic processing apparatuses according to the above-mentioned first to third embodiments. An object signal from which reverberation has been removed by the reverberation removal unit 1103 is input to the recognition unit 1104.

The recognition unit 1104 executes voice recognition processing on the input object signal. The recognition unit 1104 can execute the voice recognition processing by using any voice recognition method. The output of the recognition unit 1104 may be either of text data or symbolized information such as recognized word IDs.

When the acoustic processing apparatus 100-3 according to the third embodiment is used as the reverberation removal unit 1103, the integration unit 1012 is not necessarily required to perform IFFT processing on an integrated frequency-specific object signal, and may input the frequency-specific object signal directly to the recognition unit 1104 without any processing. Such a configuration can omit FFT processing used to extract features in the recognition unit 1104. As a result, the amount of calculation can be reduced.

The acoustic processing apparatus 100-4 in the fourth embodiment may be mounted on a single computer. Alternatively, the recognition unit 1104 may be mounted on a server, the reverberation removal unit 1103 may be mounted on a terminal, and the recognition unit 1104 and the reverberation removal unit 1103 may communicate with each other via a network.

The acoustic processing apparatus 100-4 in the fourth embodiment can apply voice recognition processing to voice from which reverberation has been removed and which has clear phonemes even in sound collecting environments where a microphone 1101 and a sound source are separated away from each other and reverberation is mixed in voice. In other words, recognition processing can be executed with high accuracy.

As described above, the first to fourth embodiments can improve the accuracy of reverberation removal processing.

Figure 12:
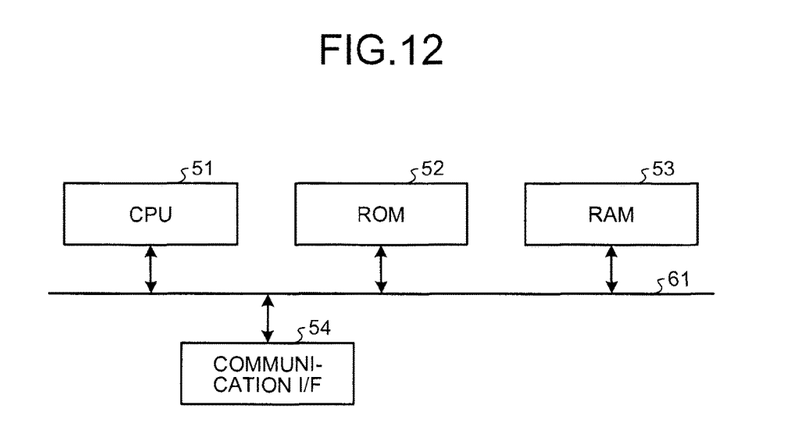
FIG. 12 is a hardware diagram of the acoustic processing apparatuses according to the first to fourth embodiments.

Next, a hardware configuration of the acoustic processing apparatuses according to the first to fourth embodiments is described with reference to FIG. 12. FIG. 12 is an explanatory diagram illustrating a hardware configuration example of the acoustic processing apparatuses according to the first to fourth embodiments.

The acoustic processing apparatuses according to the first to fourth embodiments include a control device such as a central processing unit (CPU) 51, a storage device such as a read only memory (ROM) 52 and a random access memory (RAM) 53, a communication I/F 54 configured to perform communication through connection to a network, and a bus 61 configured to connect each unit.

Computer programs executed by the acoustic processing apparatuses according to the first to fourth embodiments are provided by being incorporated in the ROM 52 or the like in advance.

Computer programs executed by the acoustic processing apparatus according to the first to fourth embodiments are recorded in a computer-readable recording medium, such as a compact disc read only memory (CD-ROM), a flexible disk (FD), a compact disc recordable (CD-R), and a digital versatile disc (DVD), in an installable format or an executable format, and provided as a computer program product.

Furthermore, computer programs executed by the acoustic processing apparatuses according to the first to fourth embodiments are stored on a computer connected to a network such as the Internet, and provided by being downloaded via the network. Computer programs executed by the acoustic processing apparatuses according to the first to fourth embodiments may be provided or distributed via a network such as the Internet.

Computer programs executed by the acoustic processing apparatuses according to the first to fourth embodiments can cause a computer to function as each unit in the acoustic processing apparatus described above. This computer can read the computer programs by the CPU 51 from a computer-readable storage medium onto a main storage device and execute the computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic processing apparatus comprising:
    a storage configured to store therein a reference signal indicating a signal obtained by completing removal of reverberation from a first observation signal included in a first processing section; and
    processing circuitry configured to:
        estimate, on the basis of a model representing an observation signal as a signal obtained by adding a signal obtained by applying a reverberation removal filter to an acoustic signal that is input with a delay and the acoustic signal, a filter coefficient of the reverberation removal filter by using a second observation signal and the reference signal; and
        determine an output signal indicating a signal obtained by removing reverberation from the second observation signal by using the second observation signal, the reference signal, and the reverberation removal filter having the estimated filter coefficient.

2. The acoustic processing apparatus according to claim 1, wherein
    the second observation signal is an observation signal included in the first processing section,
    the processing circuitry is configured to
        repeat processing of estimating the filter coefficient by using the second observation signal and the reference signal N times, where N is an integer of 2 or larger,
        repeat processing of determining the output signal from the second observation signal N times, and
        update the reference signal stored in the storage such that the output signal determined in a (n−1)th repetition, where n is an integer satisfying $2 \leq n \leq N$, is used as the reference signal in an n-th repetition.

3. The acoustic processing apparatus according to claim 2, wherein the processing circuitry is configured to use, for the first repetition, the first observation signal instead of the reference signal.

4. The acoustic processing apparatus according to claim 1, wherein the first processing section is a section obtained by dividing a processing section including a plurality of observation signals.

5. The acoustic processing apparatus according to claim 1, wherein the second observation signal is an observation signal included in a second processing section after the first processing section.

6. The acoustic processing apparatus according to claim 1, wherein the processing circuitry is configured to
    divide an input observation signal into a plurality of frequency-specific observation signals corresponding to a plurality of frequency bandwidths,
    estimate the filter coefficient by using the frequency-specific observation signal as the second observation signal, and
        determine the output signal by using the frequency-specific observation signal as the second observation signal.

7. The acoustic processing apparatus according to claim 6, wherein the processing circuitry is configured to integrate a plurality of output signals corresponding to a plurality of frequency bandwidths.

8. The acoustic processing apparatus according to claim 1, wherein the processing circuitry is configured to recognize voice included in the output signal.

9. An acoustic processing method comprising:
    storing, in a storage, a reference signal indicating a signal obtained by completing removal of reverberation from a first observation signal included in a first processing section;
    estimating, on the basis of a model representing an observation signal as a signal obtained by adding a signal obtained by applying a reverberation removal filter to an acoustic signal that is input with a delay and the acoustic signal, a filter coefficient of the reverberation removal filter by using a second observation signal and the reference signal; and
    determining an output signal indicating a signal obtained by removing reverberation from the second observation signal by using the second observation signal, the reference signal, and the reverberation removal filter having the estimated filter coefficient.

10. A computer program product having a non-transitory computer readable medium comprising instructions that cause a computer to execute:
    storing, in a storage, a reference signal indicating a signal obtained by completing removal of reverberation from a first observation signal included in a first processing section;
    estimating, on the basis of a model representing an observation signal as a signal obtained by adding a signal obtained by applying a reverberation removal filter to an acoustic signal that is input with a delay and the acoustic signal, a filter coefficient of the reverberation removal filter by using a second observation signal and the reference signal; and determining an output signal indicating a signal obtained by removing reverberation from the second observation signal by using the second observation signal, the reference signal, and the reverberation removal filter having the estimated filter coefficient.

\* \* \* \* \*